(12) United States Patent
Mohtashami et al.

(10) Patent No.: US 10,942,200 B2
(45) Date of Patent: Mar. 9, 2021

(54) HETERODYNE ATOMIC FORCE MICROSCOPY DEVICE, METHOD AND LITHOGRAPHIC SYSTEM

(71) Applicant: Nederlandse Organisatie voor toegepast-natuurwetenschappelijk onderzoek TNO, 's-Gravenhage (NL)

(72) Inventors: Abbas Mohtashami, 's-Gravenhage (NL); Maarten Hubertus van Es, Voorschoten (NL); Hamed Sadeghian Marnani, Nootdorp (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/477,633

(22) PCT Filed: Jan. 15, 2018

(86) PCT No.: PCT/NL2018/050027
§ 371 (c)(1),
(2) Date: Jul. 12, 2019

(87) PCT Pub. No.: WO2018/132011
PCT Pub. Date: Jul. 19, 2018

(65) Prior Publication Data
US 2020/0124635 A1  Apr. 23, 2020

(30) Foreign Application Priority Data
Jan. 13, 2017 (EP) .................................... 17151417

(51) Int. Cl.
*G01Q 60/24* (2010.01)
*G01N 29/06* (2006.01)
*G01Q 20/02* (2010.01)

(52) U.S. Cl.
CPC ......... *G01Q 60/24* (2013.01); *G01N 29/0681* (2013.01); *G01Q 20/02* (2013.01)

(58) Field of Classification Search
USPC ............................................................ 850/6
See application file for complete search history.

(56) References Cited

U.S. PATENT DOCUMENTS

| | | | |
|---|---|---|---|
| 5,319,977 A | 6/1994 | Quate et al. | |
| 9,134,341 B2 * | 9/2015 | Prater | ..................... G01Q 30/02 |
| 10,746,702 B2 * | 8/2020 | Sadeghian Marnani | ..................... G01Q 30/04 |

FOREIGN PATENT DOCUMENTS

WO  WO 2012/044811 A1  4/2012

OTHER PUBLICATIONS

Cuberes; et. al., "Heterodyne force microscopy of PMMA/rubber nanocomposites: nanomapping of viscoelastic response at ultrasonic frequencies", 2000, J. Phys. D: Appl. Phys. 33 2347-2355. (Year: 2000).*

(Continued)

*Primary Examiner* — Phillip A Johnston
(74) *Attorney, Agent, or Firm* — Leydig, Voit & Mayer, Ltd.

(57) ABSTRACT

A method to perform sub-surface detection of nanostructures in a sample, uses an atomic force microscopy system that comprises a scan head having a probe with a cantilever and a probe tip arranged on the cantilever. The method comprises: moving the probe tip and the sample relative to each other in one or more directions parallel to the surface for scanning of the surface with the probe tip; and monitoring motion of the probe tip relative to the scan head with a tip position detector during said scanning for obtaining an output signal. During said scanning acoustic vibrations are induced in the probe tip by applying a least a first and a second acoustic input signal respectively comprising a first (Continued)

and a second signal component at mutually different frequencies above IGHz, differing by less than IGHz to the probe, and analyzing the output signal for mapping at least subsurface nanostructures below the surface of the sample.

20 Claims, 4 Drawing Sheets

(56) References Cited

OTHER PUBLICATIONS

MT Cuberes et al., "Heterodyne Force Microscopy of PMMA/Rubber Nanocomposites: Nanomapping of Viscoelastic Response at Ultrasonic Frequencies," Journal of Physics D: Applied Physics, vol. 33, No. 19, pp. 2347-2355, XP055015577 (Oct. 7, 2000).
M. Tomoda et al., "Local Probing of Thermal Properties at Submicron Depths with Megahertz Photothermal Vibrations," Applied Physics Letters, vol. 82, No. 4, pp. 622-624, XP012034657 (Jan. 27, 2003).
European Patent Office, International Search Report in corresponding International Application No. PCT/NL2018/050227, dated Apr. 17, 2018 (3 pages).

* cited by examiner

HETERODYNE ATOMIC FORCE MICROSCOPY DEVICE, METHOD AND LITHOGRAPHIC SYSTEM

CROSS-REFERENCE TO RELATED APPLICATIONS

This patent application is a U.S. National Phase of PCT International Application No. PCT/NL2018/050027, filed Jan. 15, 2018, which claims priority to European. Application No. 17151417.7, filed Jan. 13, 2017, which are both expressly incorporated by reference in their entireties, including any, references contained therein.

BACKGROUND OF THE INVENTION

Field of the Invention

The present invention relates to a heterodyne atomic microscopy device.

The present invention relates to a method using a heterodyne atomic microscopy device.

The present invention further relates to a lithographic system.

Related Art

Use of AFM methods for nondestructive imaging of buried nanostructures is known as such. Examples of such methods are Ultrasonic Force Microscopy (UFM), Heterodyne force microscopy, Acoustic force microscopy and bimodal and trimodal force microscopy. Good results have been obtained for applications like imaging nanoparticles in cells, subsurface imaging of particles inside polymers, buried defects inside the interconnects and silicon nanowires inside polymer. All these examples are limited to rigid nanoparticles suspended and buried inside a soft matrix, e.g. polymers.

SUMMARY OF THE INVENTION

It is an object of the invention to provide for measures that enable subsurface imaging of rigid nanostructures buried under a rigid matrix. Specific examples thereof are semiconductor products.

According to a first aspect of the invention a heterodyne method is provided as claimed in claim 1.

According to a second aspect of the invention a heterodyne atomic microscopy device is provided as claimed in claim 9.

According to a third aspect of the invention a lithographic system is provided as claimed in claim 11.

In a heterodyne atomic force microscopy system at least one scan head is provided that includes a probe with a cantilever and a probe tip arranged on the cantilever. During a measurement the probe tip and the sample are moved relative to each other in one or more directions parallel to the surface for scanning of the surface with the probe tip. An output signal is obtained by monitoring during scanning a motion of the probe tip relative to the scan head with a tip position detector and the output signal obtained during said scanning is analyzed to obtain information about sub-surface features.

Other than in known AFM methods and devices, during said scanning, acoustic vibrations are induced in the probe tip by applying at least a first and a second acoustic input signal comprising a respective signal component at mutually different frequencies to the probe. These frequencies are higher than 1 GHz, and their difference is less than 1 GHz. Therewith a mixed acoustic signal is obtained that comprises a third signal component having a frequency equal to said difference. In this frequency range the acoustic output signal is determined to a large extent by scattering of the acoustic input signal at internal or sub-surface structures.

By inducing the acoustic vibrations solely in the probe it is avoided that wafer handling systems need to be modified. Therewith also the risk of backside contamination of the wafer is avoided. I.e. use of a coupling medium, which is required in case of bottom excitation to couple the sample to the transducer, is obviated. By applying top excitation a higher measurement accuracy can be obtained. In the first place this is achieved in that actuators (e.g. an electrostatic or acoustic actuator) to be used for excitation of the probe can generally be smaller then one to be used for excitation of the sample. Therewith thermal load is relatively small, therewith mitigating complications due to "thermal noises" (thermal drifts, instabilities, . . . ). In the second place the actuation efficiency can be higher as the vibrations are directly applied to the probe tip.

A particular advantage for measurements in this frequency range above 1 GHz is that parasitic mechanical vibrations stemming from the tip holder and other mechanical parts are substantially avoided without needing additional vibration dampening measures.

In accordance with these embodiments of the present invention, the further acoustic input signal may be applied via the probe tip because of the fact that proper shaping of the probe tip provides the probe tip to be responsive to a plurality of frequencies (rather then having a particular resonance frequency). For example, applying a cone shaped or pyramid shaped probe tip allows stimulation of the probe tip to such an extent that the further acoustic input signal may be applied via the tip. Of course, preferably, the acoustic input signal should be applied in such a manner that the acoustic properties of the probe tip are not negatively affected by the excitation process. The cantilever, on the other hand, due to its shape does have resonance frequencies that limit the possibility of applying the further acoustic input signal via the cantilever. This insight is in particular useful to the embodiments of the present invention wherein the acoustic signals applied have frequencies in a range above 1 GHz (gigahertz) which is far above the typical resonance frequencies of a cantilever.

By increasing the static pressure of the probe tip the acoustic output signal becomes more dependent on the elasticity of the sample surface. Accordingly, by properly selecting the static pressure both the effects of scattering and of elasticity can be measured. The proper selection of the static pressure can for example be determined by performing the measurements at various values for the static pressure using calibration samples.

Various options are possible to induce the acoustic vibrations in the probe tip. In an embodiment acoustic vibrations are induced in the probe tip with an optical excitation beam having a time varying optical power incident on the probe tip.

The optical excitation beam having the time varying optical power enables photo thermal excitation of the probe tip for inducing the acoustic vibrations. An optical excitation beam may consist of a laser (or other) optical beam having a variable intensity. The intensity of the beam or the power of the beam may be varied at the excitation frequency, i.e. the frequency of the further acoustic input signal to be applied. Thermal effects in the probe tip will cause the probe tip to start vibrating with the frequency applied via the optical excitation beam.

In this embodiment or in other embodiments, the step of sensing of the acoustic output signal is performed by making an optical sensing beam incident on the probe tip and sensing a reflected beam of the optical sensing beam using an optical sensor. As may be appreciated, in scanning probe microscopy, the probe movements are sensed using an incident optical beam that is reflected at the probe tip and detected by an optical sensor. The motion of the probe tip results in a variation of the reflection angle of the beam, which results in a variation of the location of the reflected beam on the optical sensor. This variation on the optical sensor can be detected and analyzed as being the output signal of the system. An optical excitation beam which is incident on the probe tip may also be used as the optical sensing beam, by sensing the reflection of the optical excitation beam by the optical sensor of the system. Alternatively an optical sensing beam may be used that is independent of the optical excitation beam or in the absence of an optical excitation beam, for example in case other excitation means are used.

For example in accordance with some further embodiments the step of inducing the acoustic vibrations in the probe tip is performed by means of at least one of a group comprising: an acoustic transducer connected to the cantilever or the probe tip, a piezo-electric transducer cooperating with the cantilever, an electrostatic actuator cooperating with the cantilever, an electrostatic actuator cooperating with the probe tip wherein the probe tip is flexibly attached to the cantilever, or photothermic excitation of at least one of the cantilever or the probe tip. The probe tip for example may be stimulated by applying a variable electric signal have a time varying voltage to the transducer to have the transducer generate the acoustic input signal.

In an embodiment the step of sensing of the acoustic output signal comprises providing a sensor signal using a sensor, for example an optical sensor measuring the deflection of the beam, the method further comprising a step of analyzing the first acoustic input signal with the second acoustic input signal for determining a difference between the first frequency and the second frequency, generating a reference signal including a reference signal component having a frequency equal to the difference frequency, and analyzing the sensor signal by comparing the sensor signal with the reference signal. Then, using a heterodyne method the frequency component of the output signal at the different frequency $|f_2-f_1|$ can be analyzed by forming the different frequency components by mixing the acoustic input signal and the second acoustic input signal without applying them to the sample or the probe tip.

As specified above, the probe deflection sensor may comprise an optical source arranged for producing an optical sensing beam and for directing the optical sensing beam to the probe tip, and an optical sensor arranged for receiving a reflected beam obtained by reflection of the optical sensing beam by the probe tip. However, any suitable type of probe deflection sensor may be applied. Alternative sensing techniques for example include the application of a piezo-resistive layer, the electrical resistance of which varies with probe deflection. Probe deflection may in that case be detected by detecting voltage differences in an electric signal applied to the piezo-resistive layer. As another alternative, probe deflection may be detected using a piezo-electric element or layer, the potential of which changes dependent on cantilever motion. Alternatively, capacitive measurements may be applied in an electrostatic sensing technique. As some further alternatives, one may also apply an interferometer to measure probe deflection or perform a heat flux measurement in a thermal method by using a temperature difference between probe and sample. The skilled person will be familiar with such techniques and is able to apply them in embodiments of the present invention.

The method according to the first aspect or an atomic force microscopy device according to the second aspect may be used for identifying sub-surface features in a sample. The sample may be layered device or a layered semi-finished product. A layered semi-finished product is for example semi-finished multilayer semiconductor device that comprises a device layer and a resist layer covering one or more layers including the device layer. In such a device or product a first and/or a second layer may be deliberately patterned in a manufacturing process. Alternatively or additionally, the method may be used to detect undesired patterns resulting from defects and/or stressed regions in layers that were intended to be patterned or not patterned. The results of such detection may be used to control a manufacturing process or for a quality inspection of manufactured products.

The present invention further pertains to a lithographic system for manufacturing of a multilayer semiconductor device, wherein the lithographic system comprises an atomic force microscopy device according to the second aspect. In an embodiment thereof, the lithographic system is arranged to manufacture a semiconductor device in mutually subsequent manufacturing stages, at least comprising a first manufacturing stage and a second manufacturing stage, wherein the atomic force microscopy device is arranged to inspect a semi-finished product obtained in said first manufacturing stage and to provide an analysis signal indicative for a position of sub-surface features in said semi-finished product and wherein the lithographic system is arranged to use the analysis signal for alignment of the sample in the second manufacturing stage.

The lithographic system may for example be applied for manufacturing of 3D NAND memory devices. Such devices may have a large plurality of layers e.g. more than 50 or even more than 100 layers and a thickness of several microns. Also application is conceivable for other nanotechnology products such as 3D transistors and future quantum electronics.

BRIEF DESCRIPTION OF THE DRAWINGS

These and other aspects are described in more detail with reference to the drawing. Therein.

DETAILED DESCRIPTION OF EMBODIMENTS

Like reference symbols in the various drawings indicate like elements unless otherwise indicated.

Figure 1:
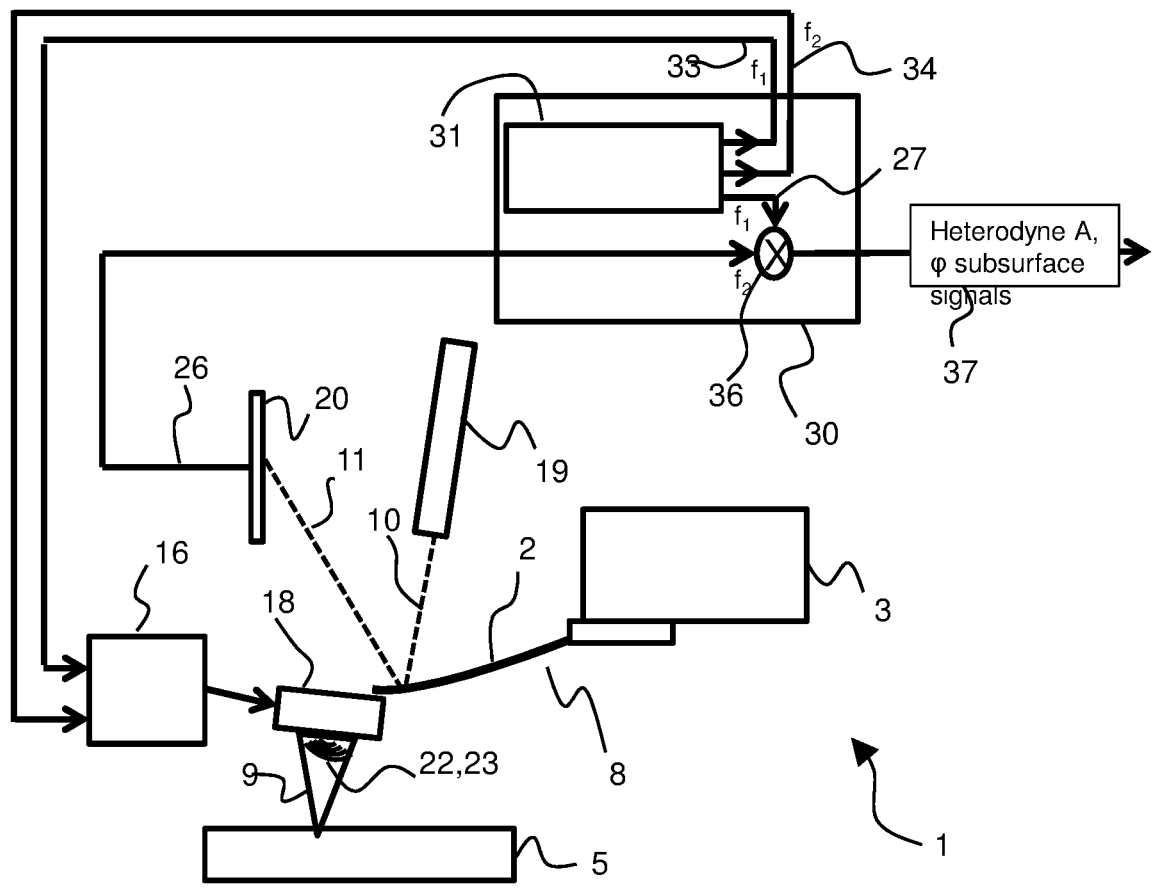
FIG. 1 schematically shows a first embodiment of an atomic force microscopy device according to the invention, FIG. 2 schematically shows a second embodiment of an atomic force microscopy device according to the invention, FIG. 3 schematically shows an embodiment of a method according to the present invention, FIG. 4 schematically shows a lithographic apparatus including an atomic force microscopy device according to the invention.

FIG. 1 schematically shows an atomic force microscopy device, the device comprising a scan head 3 with a probe 2. The probe comprises a cantilever 8 and a probe tip 9 arranged on the cantilever, The scan head 3 enables scanning of the probe 2 relative to the surface of a sample 5. The probe 2 consists of a cantilever 8 and a probe tip 9. During scanning, the probe tip 9 is brought in contact with the surface of the sample 5. For example the probe tip 9 may be scanned across the surface of the sample 5 in contact mode (continuous contact between the probe tip 9 and the surface of the sample 5) or tapping mode (periodic contact between the probe tip 9 and the surface of the sample 5 during each cycle of a vibration applied to the cantilever 8). A laser unit 19 provides a laser beam 10 that impinges on the cantilever 8 and reflects towards an optical detector 20. Using the optical detector 20, vibrations in the cantilever 8 can be sensed due to small deflections of the reflected beam 11 under influence of such vibrations. This provides an output signal 26 for further analysis. An actuator (not shown) is provided that cooperates with at least one of the scan head 3 or a sample holder (not shown) for moving the probe tip 9 and the sample 5 relative to each other in one or more directions parallel to a surface of the sample for scanning of the surface with the probe tip.

In the embodiment shown the laser unit 19 and the optical detector 20 form a tip position detector for measuring motion of the probe tip relative to the scan head during said scanning, wherein the detector 20 provides the output signal 26 indicative for the motion. However, any suitable type of position detector may be applied, such as a piezo-resistive layer, the electrical resistance of which varies with probe deflection. Probe deflection may in that case be detected by detecting voltage differences in an electric signal applied to the piezo-resistive layer. As another alternative, probe deflection may be detected using a piezo-electric element or layer, the potential of which changes dependent on cantilever motion. Alternatively, capacitive measurements may be applied in an electrostatic sensing technique. As some further alternatives, one may also apply an interferometer to measure probe deflection or perform a heat flux measurement in a thermal method by using a temperature difference between probe and sample.

An analysis system 30 is provided for receiving and analyzing the output signal 26 from the tip position detector 20. In accordance with the present invention, a generator 31 provides a first input signal 33 and in addition thereto a second input signal 34. The first input signal 33 is periodic with a frequency f1, and the second input signal 34 is a periodic signal with a frequency f2. The frequencies f1 and f2 are both above 1 gigahertz (GHz). For example, these signals may range anywhere above 1 GHz, e.g. 10 GHz or 20 GHz. Characteristic for the frequencies f1 and f2 of the input signals 33 and 34 is that the difference between f1 and f2 is below 1 GHz.

In accordance with the present invention, both the first input signal 33 and the second input signal 34 are converted into an acoustic signal to be applied during scanning. In the embodiment of FIG. 1, a transducer unit 18 is in contact with a probe tip 9, and receives the input signals 33,34 that is amplified using power amplifier 16. The transducer 18 converts the input signals 33 to an acoustic signal 23 applied to the probe tip 9. This creates acoustic waves on the surface of the sample 5 that can be picked up by the probe tip 9 when it is in contact with the surface of the sample 5. The both acoustic signals 22 and 23 will result in a mixed signal in the probe 2. The mixed signal comprises both frequency components $f_1$ and $f_2$, as well as a high frequency component $f_{high}=f_1+f_2$ and a differential frequency component $f_{diff}=|f_1-f_2|$. In particular the differential frequency $f_{diff}$ is lower than 1 GHz as it represents the difference between the frequencies $f_1$ and $f_2$. Therefore, carefully selecting the frequencies $f_1$ and $f_2$ close to each other will provide a differential frequency component $f_{diff}$ having a frequency sufficiently below 1 GHz that can be sensed via the cantilever 8. As will be appreciated, this differential frequency $f_{diff}$ must be in a range that is below a cut-off frequency characteristic for the cantilever to be picked up via the cantilever as is illustrated in FIG. 1. If this is not the case, then alternatively the differential frequency component may be picked up via the probe tip 9. As will be appreciated, any information on sub-surface structures will at least be present in the acoustic input signal 22. By mixing the two acoustic signals 22 and 23, this information is also present in the signal component at the differential frequency $f_{diff}$, which therefore becomes measurable if the frequencies $f_1$ and $f_2$ are selected to be close to each other to provide a small enough $f_{diff}$. Therefore, the output signal 26 contains the information on sub-surface structures. This output signal 26 is provided to the analysis system 30. In the analysis system 30, the output signal 26 is compared with a reference signal 27. The reference signal 27 is created by analyzing the first and second input signal 33 and 34 e.g. by digital analysis for determining their difference frequency, and generating a reference signal having a frequency component $|f_1-f_2|$. The comparison between reference 27 and output signal 26 is represented by element 36 in FIG. 1, and at the output of the analysis system 30, there is provided an output signal 37 comprising the amplitude A(x, y) and φ(x, y) of the output signal 26 from the optical detector 20. By mapping these location dependent amplitude and phase signals, sub-surface structures may be visualized in accordance with the present invention.

The acoustic signals may be applied using various different methods. In the embodiment of FIG. 1, the acoustic signals 22, 23 are applied by means of a transducer 18 that is mechanically coupled to the probe tip 9. The mechanically coupled transducer 18 is for example a piezo-electric transducer cooperating with the cantilever, an electrostatic actuator cooperating with the cantilever, or an electrostatic actuator cooperating with the probe tip wherein the probe tip is flexibly attached to the cantilever.

Figure 2:
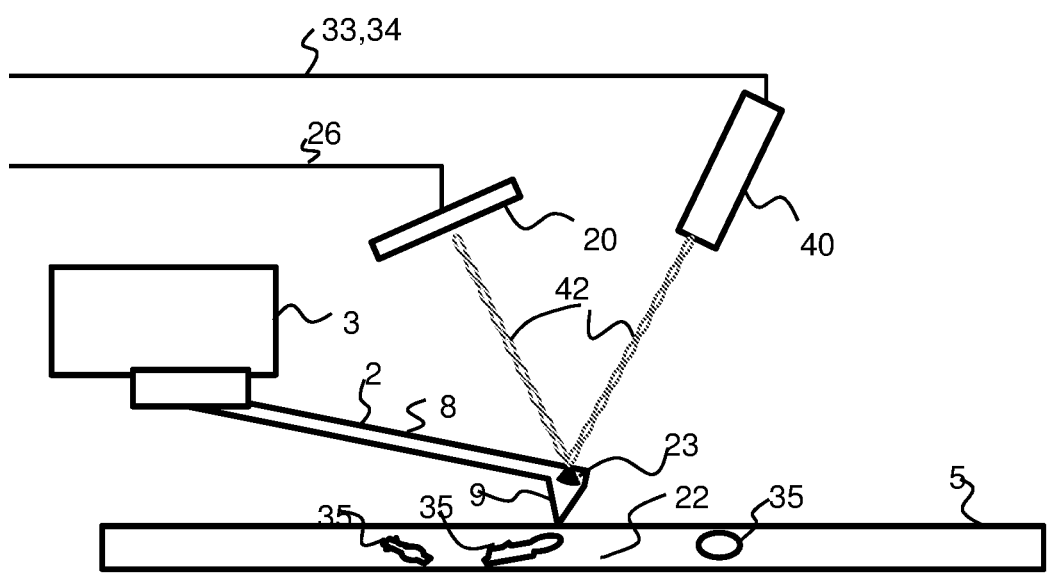

In the embodiment of FIG. 2, the input signals 33, 34 are provided to a pulsed laser source 40. The pulsed laser source 40 provides an intensity varied pulsed laser beam 42. The intensity of the laser beam 42 has frequency components $f_1$, $f_2$ identical to those of the input signal 33, 34. Due to the modulation in the laser beam 42, a variable amount of heat is provided to the probe tip 9 continuously, resulting in acoustic vibrations inside the probe tip 9. The acoustic vibrations provide for the acoustic input signal 23 illustrated in FIG. 2. Using the pulsed laser beam 42 enables to generate the acoustic input signal 23 while at the same time allowing detection of the pulsed laser beam 42 at the optical detector 20 such as to obtain the output signal 26 indicative of cantilever or probe tip vibrations. This therefore obviates the need for an additional transducer or other means for applying the acoustic signal 23 for either the probe tip 9 or sample 5. As may be appreciated, although combining the excitation beam for providing the acoustic input signal 23 with the optical sensing beam for determining probe deflection does provide advantages in terms of only requiring one beam for actuation and sensing, this is not required. The skilled person will appreciate that there may be a separate excitation beam and a separate sensing beam.

FIG. 2 also illustrates sub-surface structures 35 (which may of course be of any arbitrary shape, structure, material, or size).

Figure 3:
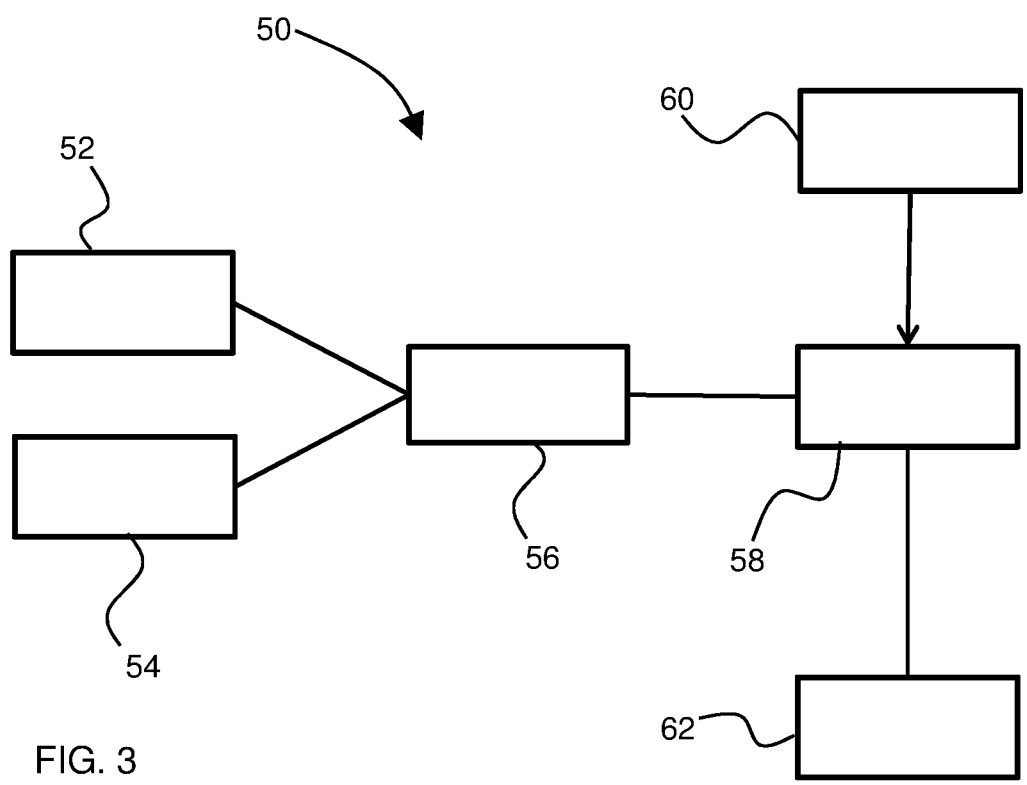

FIG. 3 schematically illustrates a method 50 in accordance with the present invention. The method 50 starts in step 52 with application of an acoustic input signal to the sample. This may for example be performed using the transducer 18 illustrated in FIG. 1 or the modulated laser beam 42 provided by laser unit 40 of FIG. 2. Alternatively, the transducer 18 of FIG. 1 may be used to provide a first acoustic signal and the pulsed laser source 40 of FIG. 2, may be used to create additional acoustic vibrations, forming the second acoustic input signal in the probe tip 9. However, a probe tip 9 may also be provided with an additional actuator unit that acts as a transducer, such as element 18 in FIG. 1. For example, a probe 2 may be electrostatically actuated by means of applying any of a variety of existing methods. For example, this may be achieved by applying a variable voltage signal to the probe tip 9, while flexibly attaching the probe tip to the cantilever by means of leaf springs.

In step 56, an output signal is detected using the detection means of the scanning probe microscopy system. Typically such detection means include a laser beam 10 or 42 that impinges on the cantilever and is received by an optical detector, as is illustrated in FIG. 1 or 2 above. However, the skilled person will appreciate that other sensor systems are available for scanning probe microscopy systems that may likewise be applied to the present invention. The output signal 56 is provided to an analysis system. Moreover, in step 60 a reference signal 27 is created at the differential frequency $f_{diff}$ which is the difference between the frequency of the first acoustic input signal provided in step 52 and the further acoustic input signal provided in step 54. The reference signal 27 is also provided to the analysis system 30. In step 58, the output signal 26 is analyzed by comparing it with the reference signal 27 received, and from this the amplitude and phase characteristics of the output signal 37 are determined. The amplitude and phase of the output signal are location dependent, and depend on the scanning position of the probe relative to the sample. The step of scanning the probe tip 9 relative to the sample 5 is not illustrated in the method 50 of FIG. 3, but will usually be present to map the amplitude and phase data in a location dependent manner for visualization of the sub-surface structures 35. However, where desired the method of the present invention may also be used to obtain a single value at one location on the surface of the sample or to perform a line scan across one or more lines. It will be appreciated that the step of scanning the probe tip 9 relative to the sample 5 may be performed by any one of moving the probe tip 9 or moving the sample 5, or moving both the probe tip 9 and the sample 5. The invention is not limited to any particular implementation in this respect.

After analyzing the output signal in step 58, the resulting amplitude and phase characteristics 37, together with the location data, are provided in step 62 as the outcome of the method of the present invention.

Figure 4:
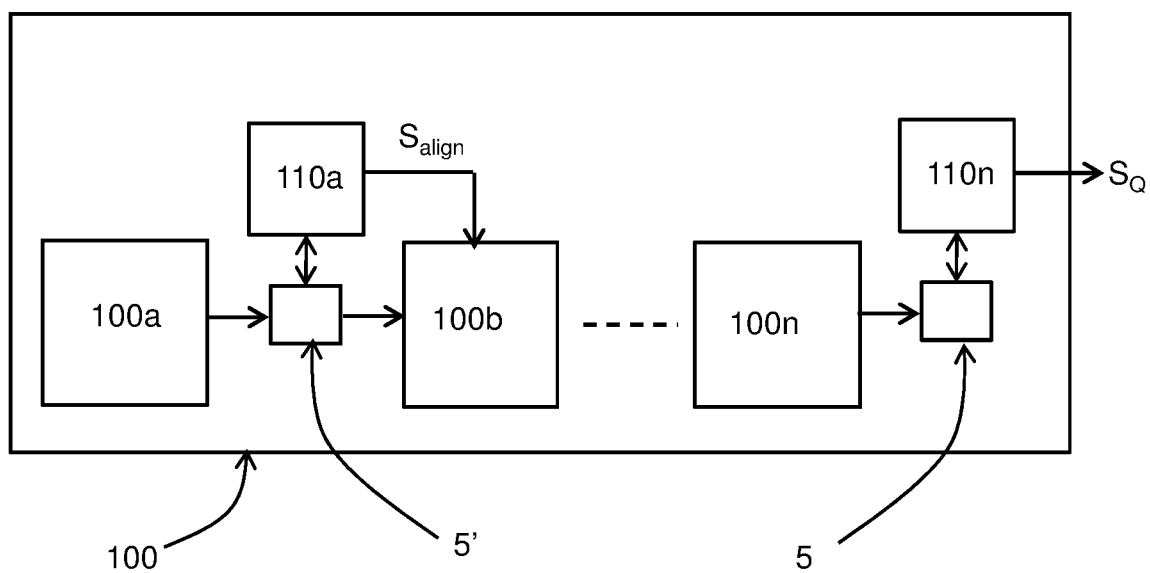

FIG. 4 schematically shows a lithographic system 100 for manufacturing of a multilayer semiconductor device 5. The lithographic system 100 comprises an atomic force microscopy device 110a according to the second aspect of the invention. The lithographic system is arranged to manufacture the semiconductor device in mutually subsequent manufacturing stages 100a, 100b, . . . 100n. The mutually subsequent manufacturing stages 100a, 100b, . . . 100n at least comprise a first manufacturing stage 100a and a second manufacturing stage 100b. The atomic force microscopy device 110a is arranged to inspect a semi-finished product 5' obtained in the first manufacturing stage 100a and to provide an analysis signal $S_{align}$ indicative for a position of sub-surface features in the semi-finished product 5'. The lithographic system 100 is arranged to use the analysis signal $S_{align}$ for alignment of the semi-finished product 5' in the second manufacturing stage 100b. In the embodiment of FIG. 4, the lithographic system 100 comprises a further atomic force microscopy device 110n that analyzes a quality of the multilayer semiconductor device 5 and provides an output signal $S_Q$ indicative for said quality. The output signal $S_Q$ may be provided as a binary signal that indicates whether or not the quality of the semiconductor device meets predetermined requirements. Alternatively, or in addition the output signal $S_Q$ may provide diagnostic information enabling an operator of the lithographic system to improve its operation.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. For example, any number of additional acoustic input signals may be applied, either to the sample or to the probe tip, without departing from the claimed invention. Also, the present invention may be combined with additional measurement techniques to obtain additional information from the combination of these. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A heterodyne method to perform sub-surface detection of nanostructures in a sample, using an atomic force microscopy system that comprises a scan head including a probe, wherein the probe comprises a cantilever and a probe tip arranged on the cantilever, wherein the method comprises:

moving the probe tip and the sample relative to each other in one or more directions parallel to a surface of the sample for a scanning of the surface with the probe tip; and monitoring a motion of the probe tip relative to the scan head with a tip position detector during said scanning for obtaining an output signal;
inducing, during said scanning, an acoustic vibrations in the probe tip by:
applying a first acoustic input signal comprising a first signal component at a first frequency to the probe, and
applying, in addition to said a first acoustic input signal, a second acoustic input signal comprising a second signal component at a second frequency,
wherein said first frequency and said second frequency are mutually different frequencies;
analyzing the output signal for generating a mapping of one or more subsurface nanostructures below the surface of the sample,
wherein both the first acoustic input signal and the second acoustic input signal are applied to the probe,
wherein said first frequency and said second frequency are frequencies above 1 gigahertz, and
wherein a frequency difference between said first frequency and said second frequency is below 1 gigahertz therewith obtaining a mixed acoustic signal that comprises a third signal component having a frequency equal to said frequency difference.

2. The heterodyne method according to claim 1, wherein the inducing the acoustic vibrations in the probe tip is performed by using an optical excitation beam incident on the probe tip,
wherein the optical excitation beam has a time varying optical power for enabling photo thermal excitation of the probe tip for inducing the acoustic vibrations.

3. The heterodyne method according to claim 1, wherein the monitoring comprises sensing the output signal by making an optical sensing beam incident on the probe tip and sensing a reflected beam of the optical sensing beam using an optical sensor.

4. The heterodyne method according to claim 1, wherein the inducing the acoustic vibrations in the probe tip is performed by using an optical excitation beam incident on the probe tip,
wherein the optical excitation beam has a time varying optical power for enabling photo thermal excitation of the probe tip for inducing the acoustic vibrations,
wherein the monitoring comprises sensing the output signal by making an optical sensing beam incident on the probe tip and sensing a reflected beam of the optical sensing beam using an optical sensor,
wherein the optical sensing beam is produced such as to comprise a time varying optical power, and
wherein the optical sensing beam also forms said optical excitation beam for inducing the acoustic vibrations in the probe tip.

5. The heterodyne method according to claim 1, wherein the inducing the acoustic vibrations in the probe tip is performed by at least one of the group consisting of:
an acoustic transducer connected to the cantilever or the probe tip,
a piezo-electric transducer cooperating with the cantilever,
an electrostatic actuator cooperating with the cantilever,
an electrostatic actuator cooperating with the probe tip that is flexibly attached to the cantilever, and
photothermal excitation of at least one of the cantilever or the probe tip.

6. The heterodyne method according to claim 2, wherein the monitoring comprises sensing the output signal by providing a sensor signal using a sensor,
wherein the method further comprises:
analyzing the first acoustic input signal with the second acoustic input signal to determine a difference between the first frequency and the second frequency,
generating a reference signal including a reference signal component having a frequency equal to the difference frequency, and
analyzing the sensor signal by comparing the sensor signal with the reference signal.

7. The heterodyne method according to claim 1, wherein the sample is a semiconductor device comprising a stack of device layers including at least a first layer and a second layer.

8. The heterodyne method according to claim 1, wherein the sample is a semi-finished multilayer semiconductor device that comprises a patterned device layer and a resist layer covering one or more layers including the patterned device layer.

9. A heterodyne atomic force microscopy device comprising:
a scan head including a probe, wherein the probe comprises a cantilever and a probe tip arranged on the cantilever;
an actuator that cooperatively operates with at least one of the scan head or a sample holder for moving the probe tip and a sample relative to each other in one or more directions parallel to a surface of a sample for a scanning of the surface with the probe tip;
a tip position detector that measures a motion of the probe tip relative to the scan head during the scanning, wherein the detector is arranged for providing an output signal indicative of the motion; and
an analysis system for receiving and analyzing the output signal from the tip position detector;
a probe actuator that induces an acoustic vibrations in the probe tip by:
applying a first acoustic input signal comprising a first signal component at a first frequency to the probe; and
applying a second acoustic input signal comprising a second signal component at a second frequency, wherein said first and said second frequency are mutually different frequencies;
wherein the analysis system is arranged for analyzing the output signal for mapping at least sub-surface nanostructures below the surface of the sample,
wherein applying a second input signal is performed by an actuator that induces an acoustic vibrations in the probe tip,
wherein the first frequency and the second frequency are above 1 gigahertz, and
wherein a difference between the first frequency and the second frequency is below 1 gigahertz thereby facilitating obtaining a mixed acoustic signal that comprises a third signal component having a frequency equal to the difference.

10. The heterodyne atomic force microscopy device according to claim 9, wherein the probe tip is cone shaped or pyramid shaped.

11. A lithographic system for manufacturing of a multilayer semiconductor device, the system comprising a heterodyne atomic force microscopy comprising:

a scan head including a probe, wherein the probe comprises a cantilever and a probe tip arranged on the cantilever;

an actuator that cooperatively operates with at least one of the scan head or a sample holder for moving the probe tip and a sample relative to each other in one or more directions parallel to a surface of a sample for a scanning of the surface with the probe tip;

a tip position detector that measures a motion of the probe tip relative to the scan head during the scanning, wherein the detector is arranged for providing an output signal indicative of the motion; and an analysis system for receiving and analyzing the output signal from the tip position detector;

a probe actuator that induces an acoustic vibrations in the probe tip by:
 applying a first acoustic input signal comprising a first signal component at a first frequency to the probe; and
 applying a second acoustic input signal comprising a second signal component at a second frequency,
 wherein said first and said second frequency are mutually different frequencies;

wherein the analysis system is arranged for analyzing the output signal for mapping at least sub-surface nanostructures below the surface of the sample, wherein applying a second input signal is performed by an actuator that induces an acoustic vibrations in the probe tip, wherein the first frequency and the second frequency are above 1 gigahertz, and wherein a difference between the first frequency and the second frequency is below 1 gigahertz thereby facilitating obtaining a mixed acoustic signal that comprises a third signal component having a frequency equal to the difference.

12. The heterodyne method according to claim 3, wherein the monitoring comprises sensing the output signal by providing a sensor signal using a sensor,
 wherein the method further comprises:
  analyzing the first acoustic input signal with the second acoustic input signal to determine a difference between the first frequency and the second frequency,
  generating a reference signal including a reference signal component having a frequency equal to the difference frequency, and
  analyzing the sensor signal by comparing the sensor signal with the reference signal.

13. The heterodyne method according to claim 3, wherein the sample is a semiconductor device comprising a stack of device layers including at least a first layer and a second layer.

14. The heterodyne method according to claim 6, wherein the sample is a semiconductor device comprising a stack of device layers including at least a first layer and a second layer.

15. The heterodyne method according to claim 7, wherein the sample is a semiconductor device comprising a stack of device layers including at least a first layer and a second layer.

16. The heterodyne method according to claim 3, wherein the sample is a semi-finished multilayer semiconductor device that comprises a patterned device layer and a resist layer covering one or more layers including the patterned device layer.

17. The heterodyne method according to claim 6, wherein the sample is a semi-finished multilayer semiconductor device that comprises a patterned device layer and a resist layer covering one or more layers including the patterned device layer.

18. The heterodyne method according to claim 7, wherein the sample is a semi-finished multilayer semiconductor device that comprises a patterned device layer and a resist layer covering one or more layers including the patterned device layer.

19. The heterodyne method according to claim 4, wherein the monitoring comprises sensing the output signal by providing a sensor signal using a sensor,
 wherein the method further comprises:
  analyzing the first acoustic input signal with the second acoustic input signal to determine a difference between the first frequency and the second frequency,
  generating a reference signal including a reference signal component having a frequency equal to the difference frequency, and
  analyzing the sensor signal by comparing the sensor signal with the reference signal.

20. The heterodyne method according to claim 5, wherein the monitoring comprises sensing the output signal by providing a sensor signal using a sensor,
 wherein the method further comprises:
  analyzing the first acoustic input signal with the second acoustic input signal to determine a difference between the first frequency and the second frequency,
  generating a reference signal including a reference signal component having a frequency equal to the difference frequency, and
  analyzing the sensor signal by comparing the sensor signal with the reference signal.

* * * * *